(12) United States Patent
Carter (10) Patent No.: US 6,477,376 B1
(45) Date of Patent: Nov. 5, 2002

(54) METHOD FOR DESIGNING WIRELESS COMMUNICATIONS CELL SITES USING UPLINK PARAMETERS

(75) Inventor: Kirk Carter, Wellington, FL (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 08/996,764

(22) Filed: Dec. 23, 1997

(51) Int. Cl.[7] .......................... H04B 17/00; H04B 1/00; H04Q 7/20
(52) U.S. Cl. .................. 455/446; 455/67.1; 455/69; 455/423; 455/449; 455/522
(58) Field of Search .................. 455/67.6, 69, 446, 455/449, 522, 423, 67.1, 59, 70

(56) References Cited

U.S. PATENT DOCUMENTS

| 5,247,699 A | * | 9/1993 | Hartman | 455/33.1 |
|---|---|---|---|---|
| 5,257,402 A | * | 10/1993 | Crisler | 455/33.2 |
| 5,398,276 A | * | 3/1995 | Lemke et al. | 379/21 |
| 5,410,736 A | * | 4/1995 | Hoque | 455/52.1 |
| 5,465,390 A | * | 11/1995 | Cohen | 455/33.4 |
| 5,491,644 A | * | 2/1996 | Pickering et al. | 364/514 R |
| 5,602,903 A | * | 2/1997 | LeBlanc et al. | 379/60 |
| 5,623,429 A | * | 4/1997 | Fortune et al. | 364/578 |
| 5,669,063 A | * | 9/1997 | Brockel et al. | 455/506 |
| 5,878,328 A | * | 3/1999 | Chawla et al. | 455/67.1 |
| 5,926,762 A | * | 7/1999 | Arpee et al. | 455/447 |
| 6,032,105 A | * | 2/2000 | Lee et al. | 455/62 |

* cited by examiner

Primary Examiner—Daniel Hunter
Assistant Examiner—Meless N. Zewdu
(74) Attorney, Agent, or Firm—Klarquist, Sparkman, LLP (57) ABSTRACT

A method for optimizing and simplifying the process of designing cell sites for mobile communications systems using uplink parameters. The method integrates a wide variety of propagation models and other utilities to provide solutions to a the most important cell design criteria. The method renders complex calculations in a usable manner.

17 Claims, 3 Drawing Sheets

*FIG. 1*

PRIOR ART

METHOD FOR DESIGNING WIRELESS COMMUNICATIONS CELL SITES USING UPLINK PARAMETERS

BACKGROUND OF THE INVENTION

Field of the Invention

The present invention relates to optimizing mobile communications systems and, more specifically, to a method and system for designing cell sites.

Background of the Invention

Figure 1:
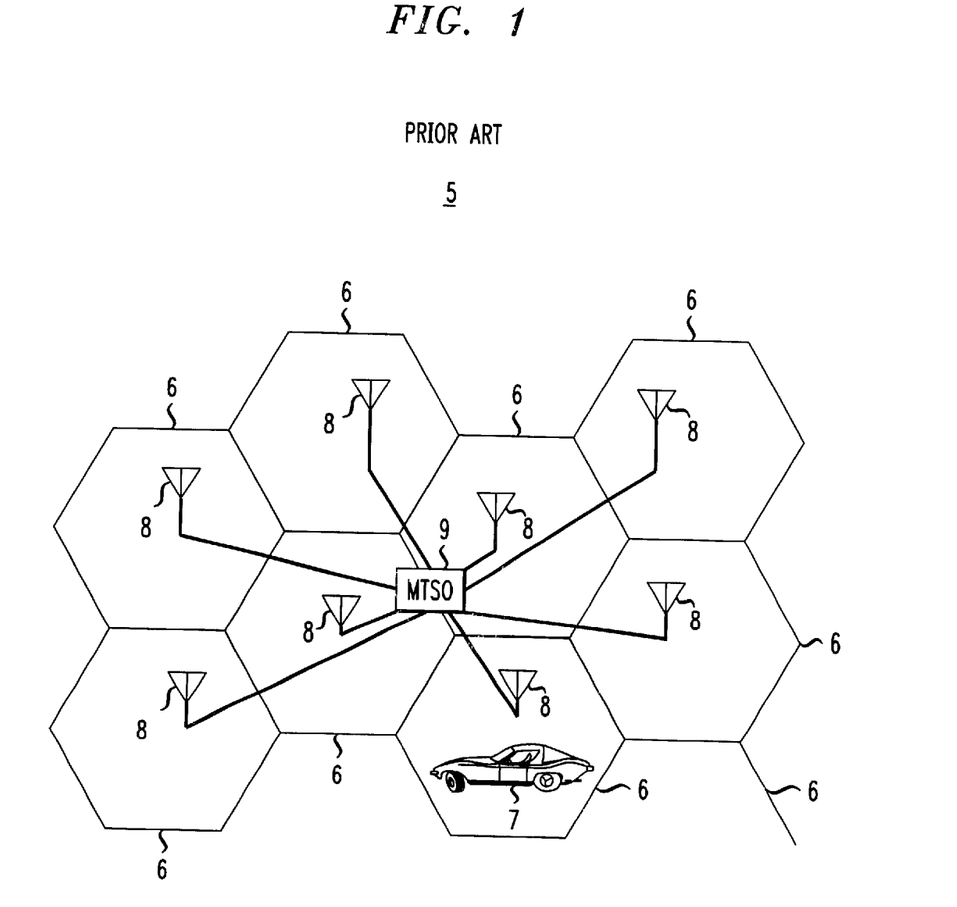
FIG. 1 is a block diagram of a conventional cellular radiotelephone system.

FIG. 1 shows a block diagram of a conventional cellular radiotelephone communication system 5 which includes cells 6, radio base stations or cell sites 8, and a Mobile Telephone Switching Office (MTSO) or mobile switching center 9. As a mobile customer 7 moves from one cell to another a switch in the MTSO automatically switches connections with the respective radio base stations to maintain a continuous connection with the public switched network (not shown). Typically, a switch in an MTSO is connected to approximately one hundred cell sites.

In the past, radio base station antenna height and gain were chosen to realize a desired coverage area in a cell site. The overall reason for this was that the 3 Watt mobile phones did not have difficulty transmitting many miles to distant sites. Typically, if there was good downlink signal strength, the uplink was thought to take care of itself. (Downlink being defined as signals travelling from the cell site to the mobile unit and uplink being defined as signals travelling from the mobile unit to the cell site). The emphasis in designing cell sites was sending the signal out to the mobile phones in the downlink. The assumption has been that if the downlink was closed, the available uplink power would be sufficient to close the uplink in view of the high power mobile transmitters. Accordingly, cell site design calculations focus on the downlink characteristics and result in design parameters that consider only the downlink path. This downlink-focused view continues despite the decrease in maximum serving distance due to the transmitting power limitations of the new handheld portable phones.

SUMMARY OF THE INVENTION

The present invention is briefly described as a method of evaluating the coverage of a geographic area serviced by a communication system. The preferred embodiment discloses a method of selecting parameters in the design of a cell site in a wireless telecommunications system, including identifying a proposed location for the cell site; determining the maximum allowable loss to close the link between the cell site and a mobile unit in a cell, based at least in part on uplink propagation parameters; calculating the predicted loss based on a selected propagation model; and selecting operating parameters so that the predicted loss is less than the maximum allowable loss.

DETAILED DESCRIPTION

Typically, cellular systems are designed assuming approximately a 3 Watt mobile phone for the uplink side of the link to the base station with the idea being to create coverage. However, with the arrival of lower power phones in the 0.6 Watt range and below, cellular systems have to be designed taking the limitations of the uplink into account.

In the past, cell site (or base station) antenna height and gain have been chosen to realize a desired downlink coverage area. (Antenna gain being the ratio, usually expressed in decibels (dB), of the power required at the input of a loss-free reference antenna to the power supplied to the input of the given antenna to produce, in a given direction, the same field strength or the same irradiance, at the same distance. When not specified otherwise, the gain refers to the direction of maximum radiation). The reason for basing cell site design on antenna height and gain is primarily that the 3 Watt mobile phones did not have difficultly transmitting many miles to distant sites. Therefore, as discussed above, if the downlink signal strength at a given location was adequate, the uplink power would be sufficient.

With lower power mobiles, the cell site design engineer has to be more concerned with the power limitations of the phone. Also, the advent of the digital system has made what was a good robust analog cellular system more sensitive to uplink (and downlink) co-channel interference (CCI). CCI occurs in frequency-reuse systems because the same frequency channel is used repeatedly in different co-channel cells. Originally when a cell site was designed there was little re-use, so there was less concern about co-channel interference or capacity. The major concern was simply coverage of the cell site area. This lead to cell site designs with maximum antenna height, gain, and transmitted power. As usage increased, capacity needed to be increased. Antennas on existing cell sites were lowered, more sites were built, and frequency re-use increased.

Since the maximum power of the most common mobile phone now is less than 0.4 Watts, therefore, for a given serving distance and antenna gain, there is a minimum height of the cell site antenna below which will not close the uplink. The minimum height that will still permit the close of the uplink for that coverage is an important parameter because that is also the height which will cause the least interference to the other sites in the system reusing those frequencies.

With the mobile phone power and serving distance (or cell radius) given, the cell site design parameters to be determined include the cell site downlink power (i.e., effective radiated power (ERP)), antenna height, antenna gain, initial phone power, power level and diversity gain.

Figure 2:
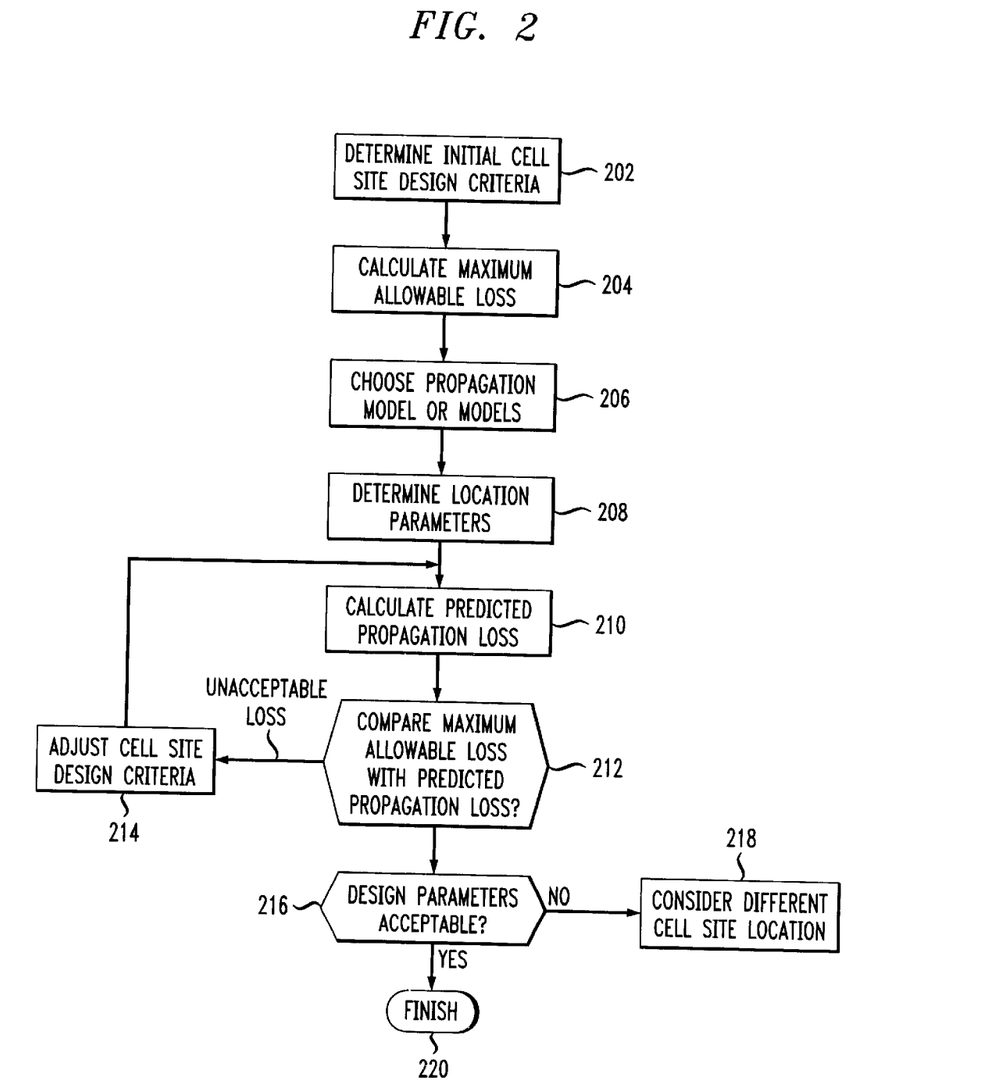
FIG. 2 illustrates a flowchart of the cell site design method of the preferred embodiment.
Figure 3:
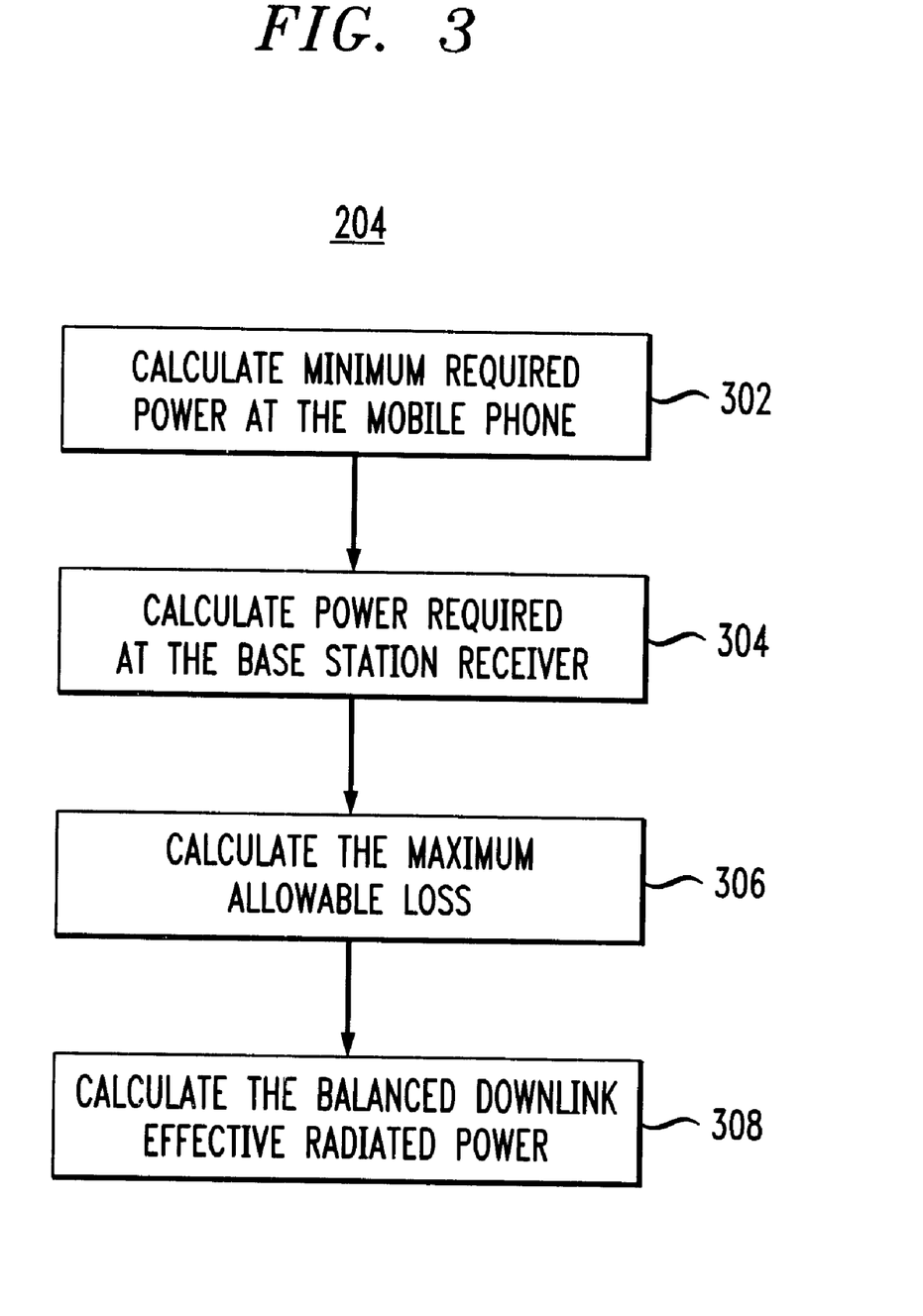
FIG. 3 illustrates a flowchart of the method for calculating the maximum allowable loss and balanced downlink power.

The method of the preferred embodiment will be described assuming a cell site location has already been chosen. FIGS. 2 and 3 disclose flowcharts which will be used to illustrate the method of the preferred embodiment.

FIRST STEP

In a first step 202 shown in FIG. 2, the initial cell site design criteria are determined using a first estimate. This step will include gathering cell site design parameters associated with this site such as feeder cable length and type. A feeder cable is a coaxial cable that runs from the radio base station equipment to the base station antennas. The design engineer will also obtain other cell site design parameters such as diameter of the feeder cable, jumper length (a jumper cable being a small flexible cable that goes from one end of the feeder cable to the base station equipment), the height of the mobile phone antenna above the ground, etc.

SECOND STEP

In a second step 204, the "maximum allowable loss" between the mobile phone and the base station antennas will be determined. The maximum allowable loss is the maximum drop in signal level between the mobile unit and the cell site antennas, before the link fails. A link analysis calculation is performed to determine the maximum allowable loss. The link analysis calculation will take into account uplink characteristics such as the mobile phone power, environmental noise, receiver sensitivity, and the minimum required carrier to interference ratio to come up with a maximum allowable loss in decibels.

As illustrated in the flowchart of FIG. 3, the method for calculating the "maximum allowable loss" includes calculating the minimum required power at the mobile phone (302) and calculating the minimum required power at the base station receiver (304). Using the minimum required base station power with the mobile phone's maximum output power, the maximum allowable loss for the uplink path can be calculated (306). Also, combining the maximum allowable loss for the uplink path with the minimum required power at the mobile phone will yield the balanced downlink power (308). The calculations used in finding the maximum allowable loss may be run using a software program such as MICROSOFT™ EXCEL™ 7.0.

Calculating the Minimum Required Power at the Mobile Phone

In step 302 as shown in FIG. 3, working from the mobile phone receiver to the base station antenna, the minimum field strength for the mobile phone downlink side can be determined.

First, noise sources and noise figures are combined to find the mobile phone receiver sensitivity. Basing the calculations on thirty Khz bandwidth of an uplink and downlink channel:

$$BW=30{,}000$$

Boltzmann's constant (k) in Ws/Kelvin (K):

$$k=1.380658 \cdot 10^{-23}$$

Antenna temperature ($T_A$) in Kelvin:

$$T_A=300$$

Antenna noise ($N_A$) in dBm:

$$N_A=10 \cdot \log(k \cdot T_A \cdot BW)+30=-129.1$$

Typical noise figure ($F_M$) of the mobile phone receiver in dB:

$$F_M=9$$

Receiver noise ($N_R$) in dBm:

$$N_R=N_A+F_M=-120.1$$

(For a more in depth discussion of these equations see R. C. V. Macario, *Cellular Radio Principles and Design*. New York: 1993, and incorporated herein by reference).

Macario's calculations show that around 850 MHz suburban man-made noise ($N_{Rs}$) is at −172 dBm (decibels referred to a milliwatt)/Hz (Hertz), urban man-made noise ($N_{Bu}$) is at −157 dBm/Hz, and receiver noise ($N_R$) is at −165 dBm/Hz:

$$N_{Ba}=-172+10 \cdot \log(BW)=-127$$

$$N_{Ru}=-157+10 \cdot \log(BW)=-112$$

$$N_R=-165+10 \cdot \log(BW)=-120$$

Environmental noise floor (NE), in dBm, for an urban system:

$$NE=-112$$

Total noise ($N_T$), summed as watts and converted back to dBm:

$$N_T = 10 \times \log\left[\left(10^{\frac{N_R-30}{10}}\right) + \left(10^{\frac{N_E-30}{10}}\right)\right] + 30 = -111.4$$

It is important to note that the environmental noise dominates the total noise. The antenna noise and receiver noise figures contribute only approximately 0.6 dB. Therefore, for most practical purposes, the environmental noise may be taken as the noise floor.

Mobile telephones are required to have a sensitivity of −110 dBm at a 3% bit-error rate (BER) for digital or −116 dBm at 12 dB signal-to-noise ratio and distortion for analog. Since the digital sensitivity is higher than the total noise, even in an urban environment, approximately −110 dBm may be taken as a point at which no signal will be registered in the receiver. (If the noise floor is known to be higher than approximately −110 dBm, then the noise floor ("Floor") may be used instead in the calculations).

$$Floor = \begin{bmatrix} N_T \\ -110 \end{bmatrix}$$

The signal-to-noise (SN) ratio required for good communication is 17 dB. Minimum signal level at the mobile receiver input ($S_R$) in dBm:

$$S_R=max(Floor)+SN=-93$$

As discussed in Ericsson Radio Systems, *RF Guidelines for CMS 8800, AS100*, Ericsson Telecom AB, 1996, and hereby incorporated by reference, the mobile phone user's body may be assumed to attenuate the signal by approximately 4 dB. Therefore, gain (Gb) (actually loss) associated with the user's body in dB is −4 and the portable antenna gain ($G_A$) in dBm is 0.

Therefore, the minimum power required at the mobile phone (Pm) in dBm:

$$Pm=S_R-(Gb+G_A)=-89$$

Fading Margin Versus Carrier-to-Interference (C/L) Ratio

The fading margin is the depth of fade, expressed in decibels, that mobile receiver can tolerate while maintaining acceptable reception quality. Fading margin was discussed in a book by W. C. Y. Lee, *Mobile Cellular Telecommunications* (2d ed.), New York: McGraw-Hill (1995) and hereby incorporated by reference. Mainly because the signal to noise ratio will cover the fading margin, fading need not be considered in the following propagation calculations. Fading margin will be accounted for by adding a margin of 12–14 dB for well-isolated indoor applications which leaves a −89 dBm required signal strength for an outdoor portable.

Penetration Losses to account for vehicle or building penetration loss, a greater downlink received signal strength indicator (RSSI) must be specified. Approximately, 3–5 dB would typically be sufficient.

Design Sensitivity

Sites could be designed for approximately −89 dB downlink signal strength, but knowing the models and assumptions are not precise, it would be prudent to include a margin for error. The hope is that the propagation model used in the preferred embodiment will be good, yet it is not expected to be perfect. Typically, a modeling margin for error of 6 dB is used. Since many models will be employed, some with better confidence level than others, a modeling margin for error may be applied to each model individually.

The "rule of thumb" −85 dB criteria for downlink RSSI was chosen empirically. It may include a margin for model error, a margin for test equipment error, a small margin for below specification phones, some extra margin for the older, less efficient portable antennas, or even that +/−1 dB accuracy of the phone's measurement analog-to-digital (A/D) converter. Deciding how much of that to build into the downlink RSSI requirement is difficult. As phone front-end sensitivity and portable antennas improve, the phone margin for error probably should be reduced.

Perhaps the easiest way to reconcile the calculated −89 dB minimum required signal strength with the empirical −85 dB is to split the difference and include a phone margin for error ($f_{port}$) of 2 dB.

$$f_{port}=2$$

Therefore, the minimum power required at the mobile (Pm) in dB after allowing for error is:

$$Pm=S_R-(Gb+G_A)+f_{port}=-87$$

Calculating the Minimum Power Required at the Base Station Receiver (Base Station RSSI Requirement)

In step 304, the power required at the base station receiver is calculated. Base antennas may get much hotter than portable antennas. Antenna temperature ($T_A$) in Kelvin is 339. The antenna noise ($N_A$) in dBm is:

$$N_A=10\cdot\log(k\cdot T_A BW)+30=-128.5$$

The noise figure (Fb) of the base receiver in dB:

$$Fb=4$$

The base receiver noise ($N_R$) in dBm:

$$N_R=(N_A+Fb)=-124.5$$

Using Ericsson's RBS 884 macrocell equipment as an example, it has a listed receive sensitivity of −112 dBm for 3% BER. Ericsson's RBS 884 microcell equipment lists −115 dBm for 3% BER. The calculated receiver noise is below this. Therefore, a decision should be made between starting with the receiver sensitivity or the environmental noise. Assuming a 10 dB building insertion loss for a microcell application:

$$L_{bld}=10$$

Noise floor inside a building ($N_{Tbld}$) in an urban environment:

$$N_{Tbld}=N_T-L_{bld}=-121$$

So, for indoor microcells, the receiver sensitivity may be started with. This assumes an electrically quiet building. Measuring the actual noise floor in the building might be wise because computers and fluorescent lights emit considerable electromagnetic interference (EMI). In factories and machine shops, the electromagnetic noise could be extremely strong. As with outdoor applications, start with the greater of the two—noise floor or receiver sensitivity ($R_{sense}$):

$$R_{sense}=-112$$

$$Floor=\left[\begin{array}{c}N_T\\R_{sense}\end{array}\right]$$

Signal-to-noise ratio (SN) required for good communication in dB is 17. The multicoupler gain ($G_{mult}$) is 5.2 and a conservative estimate of the diversity gain ($G_{div}$) is 3.75.

The feeder loss from each Rx antenna depends on feeder length and type. Assuming 1⅝" (loss 0.00767 dB/foot) for sites 100' and greater and assuming ⅞" (loss 0.0123 dB/foot) for sites less than 100':

$$L_{feeder}=0.923$$

The jumper loss also includes the connector losses. It is an estimate based on 15' of ½" Heliax:

$$L_{jumper}=0.6$$

Maximum antenna gain:

$$G_{ant}=12$$

Minimum signal power at the base receiver antenna in dBm:

$$Pb=(max(Floor)+SN)-(G_{mult}+G_{ant}+G_{div})+(L_{feeder}+L_{jumper})=-113.8$$

To cover a multitude of uncertainties in this calculation a margin for error should be added. A typical 90° antenna will have approximately 6 dB less gain at the 120° points. This value will cover the inaccuracies in the feeder length, diversity gain, duplexer loss, and the fact that the antenna gain (even on the main beam) is really not 12 dB at ground level. Therefore, the margin of error is the following:

$$f_{base}=6$$

Therefore, the minimum signal level at the base receiver antenna (Pb) in dBm after adjusting for error will be found with the following equation:

$$Pb=(max(Floor)+SN)-(G_{mult}+G_{ant}+G_{div})+(L_{feeder}+L_{jumper})+f_{base}=-107.8$$

Calculating Maximum Allowable Loss

In step 306, calculate the maximum allowable loss.

From the base station point of view, besides random (white) noise sources, most of the inband noise is actually interference coming in from portables served by distant co-channel sites. Reducing the power levels of portables to a bare minimum, by adjusting power windows and power level control/power level voice maximum (PLC/PLVM) settings, should bring the noise floor down. Reducing the noise floor has the effect of dropping the starting point of the minimum received signal power calculations. That, in turn, allows the portable power to be reduced in a positive feedback loop. The limits on this are the white noise present in the environment, spurious transmissions, and receiver sensitivity.

From the portable point of view, limiting downlink power reduces co-channel interference, which allows the downlink power again to be reduced. Ideally, the minimum required power at the mobile phone would be met everywhere, but that requires dynamic downlink power control. The best practical solution is to reduce both uplink and downlink power to a minimum. Power should be turned down, not only enough to meet the 17 dB carrier-to-interference ratio (C/I) but also until the minimum signal power is transmitted for good call quality along the worst channel paths. The minimum power is just enough to overcome the maximum allowable loss in the propagation channel. Whatever buildings, trees, tinted windows or concrete walls are in the way, all the losses are lumped into one number—the maximum allowable loss.

As discussed, mobile phones can typically transmit at approximately 0.6 watts maximum. Many phones have been reported to transmit at only 400 milliwatts and, therefore, this will be used at the worst case maximum power.

Maximum ERP of portable in dBm:

$$P_{m\_max} = 10 \cdot \log(0.4) + 30 = 26$$

Maximum allowable path loss for uplink ($L_{uplink}$) in dB:

$$L_{uplink} = P_{m\_max} - Pb = 133.8$$

Any portable should be able to provide an acceptable uplink signal reaching a "distance" of 134 dB (with the set of assumptions about the base station equipment made above). The physical distance depends on a very large number of variables. That is the reason the propagation models are so inaccurate. Values cannot be determined and entered for such a large number of variables.

Calculating Balanced Downlink Effective Radiated Power (ERP)

In step 308, determine what base station ERP would precisely balance the uplink. It can be shown that because downlink frequencies are 45 MHz above uplink frequencies, the path loss will be approximately 0.46 dB greater (in free space).

Base station ERP for path balance (dBm):

$$P_{b\_bal} = Pm + L_{uplink} + 0.46 = 47.3$$

Base station ERP for path balance (Watts):

$$P_{b\_bal\_w} = 10^{\frac{P_{b\_bal}-30}{10}} = 53.7$$

In summary, in this second step 204, a method has been used for calculating four critical parameters in the design of a cell site:

Power required at the base station receiver

Power required at the mobile phone

Maximum allowable path loss

Balanced downlink ERP

Combining these criteria with the right choice of propagation model will yield the minimum base station height for a given cell radius, the radius for an existing site, and/or the effect of a change in base antenna gain.

THIRD STEP

In a third step 206 in FIG. 2, choose the propagation model or models to be used in calculating the predicted signal loss. There is no single, all inclusive formula for determining the mean signal strength loss experienced by a radio signal. Predicting signal strength loss is a tricky business because hundreds or thousands of factors influence it in important ways. There is no single environmental parameter that dominates the propagation mechanism enough to ignore all the others. Therefore, a choice is made among many different models, each optimized for a particular application. Many models include the effect of one or more of the following: a direct line of sight (LOS) propagation path, a path including a reflection off of the ground or buildings, a diffracted path around a building corner or over a roof edge, and a scattered path (that is, a diffuse reflection) off some object such as a building or truck.

In the third step 206, the initial guess for base station antenna height will be compared with the stated range of validity of each model. The serving distance will be checked against the range given for each model. In this way, a propagation loss model or models is chosen to fit the situation. The models vary in complexity and in the amount of required information. Therefore, the choice is among many different models, each optimized for a particular application.

There are several different types of models that are currently being used. Empirical models are based on collected data, fitted to a curve. Deterministic models are derived from geometrical optics or diffraction theories. Stochastic models include the statistical nature of fading. Mixtures of these types are also possible. No model is perfectly accurate because the exact nature of fading depends on the exact nature of the environment. The major features of the environment can be modeled, but never every detail. The more details a model requires as input, the more accurate it tends to be.

It is important to note that a radical change in the dominating propagation factors occurs when a base station antenna is at or below the average surrounding roof height. As previously discussed, a microcell is defined as one which has its base antenna at or below roof height and a macrocell has its antenna above roof height. Macrocells have different propagation, interference, reuse, capacity, and handoffs compared to microcells. Therefore, a different model should be used and the coverage patterns will be quite different. With the preferred embodiment, one advantage is that macrocells and microcells can be designed for a particular uplink loss. The preferred embodiment will allow for differentiation between the two or more accurate cell site design.

Line of Sight (LOS) Models

The first type of model that may be used with the preferred embodiment is the LOS model.

In the LOS case, at least two basic methods are available for calculating loss in the preferred embodiment.

The first method is Hagerman's model as discussed in B. Hagerman, "Downlink Relative Co-Channel Interference Powers in Cellular Radio Systems," *Proceedings of the IEEE Vehicular Technology Conference,* 1995, pp. 366–370, which is hereby incorporated by reference. This model is an empirical approximation to the full deterministic equations. The gradual transition from the first path loss slope to the second is approximated by a smoothing function artificially inserted for that purpose. This model can be optimized using "walk data." The slopes are adjusted (particularly the second) until the losses at many data points match the predicted loss for that distance—within about 8 dB. When using this model, the cell site designer should build up a table of slopes to use on common street types in the design area.

The second method is Maciel LOS model as disclosed in H. L. Bertoni and L. R. Maciel, "Cell Shape for Microcellular Systems in Residential and Commercial Environments", *IEEE Transactions on Vehicular Technology*, Vol. 43, No. 2, May, 1997, pp. 270–277, and hereby incorporated by reference. This model is the full deterministic equation for both direct and reflected rays. The characteristics of the reflecting surface may be entered. Maciel LOS can be used over water, various types of open land, or swamps. The mobile phone must be LOS from the site. If the direct ray is not present, the mobile is no longer LOS, and the model will fail.

Whichever LOS method is used, an interesting phenomenon emerges. The loss follows one logarithmic slope for some distance from the base station, then changes over a short distance to a different logarithmic slope. The slope-change point is called the breakpoint. Before the breakpoint, slope factors of less than 2 have been observed. After the breakpoint, the model follows a slope closer to 3 or 4. The prediction accuracy deteriorates after the breakpoint. The qualitative reason given for this breakpoint phenomenon is that near the base a significant amount of energy is scattered off the surroundings. Scattering is the diffuse reflection of energy from a surface with large irregularities compared to the wavelength. Free space loss is given for the direct ray, but scattered rays add to the direct ray, making the total loss less than that of free space. Further down the street, the diffuse energy drops off but reflections from the pavement and the buildings along the side contribute to the total RSSI. A reflected wavefront usually undergoes a complete phase reversal at the reflection point. Therefore, it interferes with the direct ray constructively or destructively, depending on the relative path lengths. Millions of rays, all with slightly different path lengths, tend to add up to a fairly continuous signal strength (accounting for the small slope factor) until the reflection angle becomes very small. Then the reflected rays tend to always cancel the direct rays, because their path lengths are almost equal. The greater the distance and the closer the path lengths are to each other, the more cancellation occurs. Actually, the break "point" is really a break "region" because the change in angle is gradual.

The sum of the direct and ground reflected rays can be described by a simple equation. The following is a sample with a few variables sized for a hypothetical microcell.

Receive antenna height ($h_R$) in meters:

$h_R=2$

Transmit height ($h_T$) in meters:

$h_T=10$

Wavelength at the center of the cellular downlink band:

$$\lambda = \frac{3 \cdot 10^8}{880 \cdot 10^6} \quad \lambda = 0.341$$

Distance from transmitter in meters:
d=10, 11 . . . 1600 Range is used only for graphing.
Power of summed direct and ground rays:

$$P(d) = 4 \cdot \left( \sin\left( \frac{2 \cdot \pi \cdot h_R \cdot h_T}{\lambda \cdot d} \right) \right)^2$$

It is important to note that the signal level varies greatly with a small change in distance near the site. After a certain point, the signal level will look much like a logarithmic decay. In optics terms, the breakpoint is the edge of the first Fresnel zone. This can be found using the following equation:

$$d_{bp} = \frac{4 \cdot h_R \cdot h_T}{\lambda} = 234.7$$

Any distance units can be used, as long as the heights are in the same units. Frequently, the breakpoint is defined as the point where the sine argument is exactly ½, which implies the breakpoint formula is:

$$d_{bp} = \frac{4 \cdot \pi \cdot h_R \cdot h_T}{\lambda} = 737.2$$

These could be taken as the beginning and ending points of the break "region". However, most researchers use the first equation (without pi) and prefer to imagine the transition beginning just before the breakpoint and ending just after it.

Hagerman's Model

Hagerman's formulation is a good example:
Receiver height (m):

$h_R=1.5$

Transmitter height (m):

$h_T=S$

Breakpoint distance from transmitter (m):

$$d_{bp} = \frac{4 \cdot h_R \cdot h_T}{\lambda} = 88$$

Transmitter-receiver separation (m):

R=10, 11 . . . 1000 for graphing

Loss at 1 meter, from free space loss equation:

c=31.33

Path loss slope before breakpoint:

$m_1=2$

Path loss slope after breakpoint:

$m_2=4$

Smoothing factor—not critical q=4

$$L_H(R) = 10 \cdot (m_1 \cdot \log(R)) + \frac{10}{q} \cdot \log\left[ 1 + \left( \frac{R}{d_{bp}} \right)^{(m_2 - m_1) \cdot q} \right] + c$$

The difficulty using this model is the choice of $m_1$ and $m_2$. These seem to depend on wavelength, but no mathematical relation has been derived. The values used here correspond to 20 dB per decade and 40 dB per decade. For $m_1$, 2 is a good choice for one or two-story building lined streets. For urban canyons, 1.5 should be used for no trees and 1.7 for tree lined canyons. For $m_2$, 4 should be used as a default, going higher for streets with more clutter. This will be higher still if the signal is traveling over trees or something other than pavement. In that case, use the next model.

Maciel LOS Model

This model is a deterministic LOS loss equation that does indeed give a slope of about 17 dB per decade up to the breakpoint and, thereafter, about 36 dB per decade. The Maciel LOS model's gradual breakpoint corresponds roughly to the one expected from the above Fresnel zone equation. It is based on the two-ray picture of propagation down a city street, so it does not account for extra energy from scattering or reflections off buildings. Maciel LOS would be a good choice for suburban streets, especially tree-lined suburban streets, with one or two-story buildings. For LOS propagation loss down an urban canyon, Hagerman's LOS equation should be used with $m_1=1.5$ to $1.7$ Base station height (m):

$$Hs=4$$

Mobile height (m):

$$Hm=1.8$$

Breakpoint distance (m):

$$d_{Bp} = \frac{4 \cdot Hs \cdot Hm}{\lambda} = 84.5$$

Permittivity of the street:

$$\epsilon_r=15$$

Conductivity of the street:

$$\sigma=0.005$$

Reflection coefficient:

$$\epsilon = \epsilon_r - j \cdot \alpha \cdot \sigma \cdot \lambda$$

Range of distances for graphing:

$$R=10, 11 \ldots 1000 \text{ do we want this in here if there's no graph?}$$

Reflection angle, stated as a function of mobile distance:

$$\alpha(R) = \operatorname{atan}\left(\frac{Hs+Hm}{R}\right)$$

Loss factor due to reflection:

$$\Gamma(R) = \frac{\epsilon \cdot \sin(\alpha(R)) - \sqrt{\epsilon - \cos(\alpha(R))^2}}{\epsilon \cdot \sin(\alpha(R)) + \sqrt{\epsilon - \cos(\alpha(R))^2}}$$

Wave number:

$$k = 2 \cdot \frac{\pi}{\lambda}$$

Length of direct ray:

$$r_1(R) = \sqrt{R^2 + 30(Hs-Hm)^2}$$

Length of reflected ray:

$$r_2(R) = \sqrt{R^2 + 30(Hs+30Hm)^2}$$

Maciel LOS loss model:

$$L_{Maciel}(R) = 20 \cdot \log\left[\left(\frac{\lambda}{a\pi}\right) \cdot \left|\frac{1}{r_1(R)} \cdot \exp(-j \cdot k \cdot r_1(R)) + \Gamma(R) \cdot \frac{1}{r_1(R)} \cdot \exp(-j \cdot k \cdot r_2(R))\right|\right]$$

Since this model was derived from basic physical laws, using permittivity and conductivity of the reflecting surface as parameters, it should be usable in every situation for which $\sigma$ and $\epsilon_r$ are available. Here are some examples:

TABLE 1

Maciel LOS Loss Model Parameters

| Situation | $\sigma$ | $\epsilon_r$ |
|---|---|---|
| Dry ground | 0.001 | 3–7 |
| Average ground | 0.005 | 15 |
| Wet ground | 0.02 | 25–30 |
| Sea water | 5 | 81 |
| Fresh water | 0.01 | 81 |
| Sandy soil (dry) | 0.00001 | 4 |
| Street | 0.005 | 15 |
| Street & Bldg. avg. | 0.001 | 10 |

The accuracy of these LOS models falls off gradually with distance. The closer reality matches the assumptions behind the models (no reflections from buildings lining the streets, no scattering from vehicles or other effects), the closer the prediction will be. As the clutter between the mobile and base increases, the prediction accuracy drops. The models are good from about 50 meters to 2 km, for base station heights of 5 to 20 m. These are really microcell and small macrocell models.

Non Line of Sight (NLOS) Models

For the NLOS case, propagation occurs through urban or suburban areas over ranges of a few meters to 1 km. NLOS models are suitable for microcells (below roof height, no matter how high) and small macrocells (just over roof height to about 30 m) where there is no LOS component in the received signal.

When a base station's antenna is below the surrounding roof height, the dominating propagation mechanisms are reflections off the street, reflections off the buildings lining the street, and diffraction around building corners. If the base antenna is above the roof height, the signal components are mainly the waves diffracted over the edges of rooftops. As stated earlier, the contribution of scattering to the overall RSSI becomes insignificant a short distance from the base station. Models rarely include a scattering component.

The models presented here fall into two broad categories: base heights below rooftops and base heights at or above rooftops. Both types require the tedious math of diffraction theory, but various researchers have simplified the nested integrals into relatively friendly equations.

Joe NLOS Model for Below Rooftops

This model is discussed in J. Wiart, "Micro-Cellular Modeling When Base Station Antenna is Below Rooftops," *Proceedings of the IEEE Vehicular Technology Conference*, 1994, pp. 200–204, which is hereby incorporated by reference. These empirical formulas leave out the rapid fluctuations (fast fading) that the Universal Theory of Diffraction (UTD) method preserves, but seem to follow the mean loss very well. This model assumes infinite building height—no part of the signal is assumed to be able to diffract over the tops of buildings. This model also assumes no signal will travel through buildings to a parallel street and that there are no significant gaps between buildings. The derivatives assume a permittivity of 10 and a conductivity of 0.001 for the reflections.

Note that only one term is given for diffraction and one for reflection. A mobile phone turning a second corner may experience reflection and diffraction losses around that corner in addition to those of the first corner. Careful analysis of a street map may show that the signal could take a different path to the mobile after a second or third corner is turned. This method typically only applies to base station antennas significantly lower than the surrounding rooftops.

Distance from the base to a line drawn through the mobile, parallel to the side street that the mobile is on:

$$d=20$$

Width of the street the base is on:

$$w1=10$$

Width of the street the mobile is on:

$$w2=15$$

Distance from mobile to the nearest edge of the street the base is on:

$$x=30$$

Wavelength at the center of the cellular downlink band:

$$\lambda = \frac{3 \cdot 10^8}{880 \cdot 10^6}$$

Loss on the side street due to free space propagation and reflection from the building visible from both the base and the mobile:

$$L_{ref} = 20 \cdot \log(d+x) + \frac{d \cdot x}{w1 \cdot w2} + 20 \cdot \log\left(\frac{4 \cdot \pi}{\lambda}\right)$$

Mean diffraction factor:

$$D = \left(\frac{20}{\pi}\right) \cdot \left[\operatorname{atan}\left(\frac{x}{w2}\right) + \operatorname{atan}\left(\frac{d}{w1}\right) - \frac{\pi}{2}\right]$$

Street crossing angle, measured from the base street to the mobile street:

$$\alpha=90$$

Additional loss due to non-right angled streets:

$$L_{sup}=0.1(90-\alpha)$$

Loss on the side street due to free space propagation and the diffraction around the nearest building corner:

$$L_{diff} = 10 \cdot \log(x \cdot d \cdot (x+d)) + 2 \cdot D + 20 \cdot \log\left(\frac{4 \cdot \pi}{\lambda}\right) + L_{sup}$$

Power sum of the two losses ($L_{Joe}$):

$$L_{Joe} = -10 \cdot \log\left(10^{\frac{-L_{ref}}{10}} + 10^{\frac{-L_{diff}}{10}}\right) = 69.2$$

The first and last terms in both $L_{ref}$ and $L_{diff}$ taken by themselves are just the free space loss. If the second, steeper slope in the LOS models were ignored and the initial slope was set to 20 dB/decade, they would be exactly the same. This is because the model assumes one direct wave experiencing a free space loss as it travels from the base antenna to the reflecting corner, and another ray or wave seeing the free space loss to the diffracting corner. The middle term in each loss equation is a correction factor for the reflection or diffraction. Finally, the model sums the two modified rays in the linear power domain (as Watts rather than dB). The result is an empirical model derived from a deterministic two-ray tracing model.

The LOS model cannot be substituted for the free space terms in each loss equation because the ground ray will not contribute any significant energy at the mobile's position around the corner. Imagine the ground ray hitting the opposite corner building, where the direct ray is assumed to reflect down the side street. Angle of incidence equals angle of reflection, so the ground ray heads skyward. At the diffracting corner, the result is the same. The ground ray may diffract around the corner then head up to the sky, not down the side street. The buildings block any direct ground ray.

In the case of turning a second corner, it seems logical to handle this situation by adding another reflection correction factor (with new values, if needed) to the $L_{ref}$ found from the first corner. Similarly, add a second diffraction correction factor to the original $L_{diff}$. The distance from mobile to base x would have to increase to account for the added distance in the first terms. In other words, add correction for the second corner to the free space loss in the same way as it was added for the first corner.

Distance from the base to a line drawn through the center of the first side street the mobile was on:

$$d=23$$

Distance from the center of the street that the base is on to a line drawn through the mobile, parallel to the street the mobile is now on:

$$d'=50$$

Width of the first street the mobile was on:

$$w1'=w2$$

Width of the street the mobile is now on:

$$w2'=10$$

Distance from the mobile to the nearest edge of the street the mobile was on:

$$x'=30$$

Loss on the second side street due to free space propagation and reflection from the building visible from both the base and the mobile:

$$L_{ref} = 20 \cdot \log(d + d' + x') + \frac{d \cdot d'}{w1 \cdot w2} + \frac{d' \cdot x'}{w1' \cdot w2'} + 20 \cdot \log\left(\frac{4 \cdot \pi}{\lambda}\right)$$
$$= 89.255$$

Mean diffraction factor, first building corner:

$$D = \left(\frac{20}{\pi}\right) \cdot \left[\operatorname{atan}\left(\frac{d'}{w2}\right) + \operatorname{atan}\left(\frac{d}{w1}\right) - \frac{\pi}{2}\right]$$

Mean diffraction factor, second building corner:

$$D' = \left(\frac{20}{\pi}\right) \cdot \left[\operatorname{atan}\left(\frac{x'}{w2'}\right) + \operatorname{atan}\left(\frac{d'}{w1'}\right) - \frac{\pi}{2}\right]$$

Street crossing angle, measured from the base street to the mobile street:

$\alpha = 90$

Street-crossing angle, measured from the first mobile street to the mobile street:

$\alpha' = 90$

Additional loss due to non-right angled streets, at first corner:

$L_{sup} = 0.1(90 - \alpha')$

Additional loss due to non-right angled streets at second corner:

$L'_{sup} = 0.1(90 - \alpha)$

Loss on the side street due to free space propagation and the diffraction around the nearest building corner:

$$L_{diff} = 10 \cdot \log(x' \cdot (d + d') \cdot (x' + d + d')) + 2 \cdot D + 2 \cdot D' +$$
$$20 \cdot \log\left(\frac{4 \cdot \pi}{\lambda}\right) + L_{sup} + L'_{sup}$$
$$= 108.124$$

Power sum of the two losses ($L_{Joe}$):

$$L_{Joe} = -10 \cdot \log\left(10^{\frac{-L_{ref}}{10}}\right) + \left(10^{\frac{-L_{diff}}{10}}\right) = 89.2$$

Compare the first loss, 69 dB, with the second loss, 89 dB. Turning the second corner made a big difference. The usual penalty used in urban microcell propagation is about 20 dB.

The distances have been described in terms of a mobile phone starting at the base and moving away, taking two successive turns down side streets. That was done only to make it easier to describe the geometry of the problem. In fact, there is no dependence on how the mobile arrived at its location. When using the Joe model, the cell site designer will look at all the street paths the radio frequency (RF) energy can be guided down to get to the mobile. After a turn or two, a totally different path than the one traveled by the mobile could easily be the strongest one for the RF. No doubt, in some situations, the contributions for each path should be power summed.

After a certain distance from the base, the mobile phone will see mostly the energy diffracted over the rooftops. The transition from dominance of the street guided rays to dominance of rays diffracted over the roof is gradual. Unfortunately, a complete ray tracing model would have to be used to get an accurate picture of the transition. The Wiart model ignores rooftop diffraction, whereas the next model ignores street guided rays.

NLOS Model for Rooftop Diffraction: Base Below, Level With, or Above Rooftops

These models are discussed in Bertoni and Maciel, "Cell Shape for Microcellular Systems in Residential and Commercial Environments," *IEEE Transactions on Vehicular Technology*, Vol. 43, No. 2, PP. 270–277 and hereby incorporated by reference.

Base Antenna Height Equal to Roof Height

This first variation of the Bertoni model is that of base antenna height equal to roof height.

Local average roof height:

$h_B = 6$

Mobile height:

$h_m = 1.5$

Base height:

$H_S = 6$

Distance from the last row of diffracting buildings to the mobile:

$x = 4$

Number of rows of diffracting buildings between the base and the mobile:

$N = 5$

Diffraction factor for base height equal to roof height only:

$$Q = \frac{1}{N}$$

Wavelength at the center of the cellular downlink band:

$$\lambda = \frac{3 \cdot 10^8}{880 \cdot 10^6}$$

Wave number:

$$k = \frac{2 \cdot \pi}{\lambda}$$

Distance from base to the mobile $R = 60$

Last roof edge diffraction angle:

$$\Phi = \mathrm{atan}\left(\frac{h_B - h_m}{x}\right)$$

If there are no more rows of buildings beyond the mobile, the reflection factor should typically be set to 2, otherwise it may be set to 1. This accounts for the reflection of the diffracted wave off the row of buildings on the opposite side of the street back to the mobile:

$$refl = 2$$

Bertoni model for base height equal to roof height:

$$L_{\text{Bertoni\_e}} = -20 \cdot \log\left(\frac{\lambda}{4 \cdot \pi \cdot R}\right) -$$

$$20 \cdot \log\left[\frac{Q}{\sqrt{refl \cdot \pi \cdot k \cdot \sqrt{x^2 + (h_B^2 - h_m^2)}}} \cdot \left|\left(-\frac{1}{\Phi} + \frac{1}{2 \cdot \pi + \Phi}\right)\right|\right]$$

$$L_{\text{Bertoni\_e}} = 109.6$$

Base Antenna Height Above Roof Height

The next variation of the Bertoni model is that of base antenna height above roof height. This variation typically works best if the base antenna is not too far above the roof height. However, that is not harmful because the use of this model is recommended for base heights no more than 5 meters over the local rooftops. The expression for Q is an empirical one. It was devised by curve fitting a set of data calculated using the rigorous method. Again, accuracy has been sacrificed for ease of use. The model assumes that the signal diffracts over rows of buildings of uniform height. If they are not, then the cell site designer may simply average the building heights. Another simplification assumed here is that the buildings are spaced at equal intervals. If they are not, the design engineer should use an average spacing.

Local average roof height:

$$h_B = 6$$

Base height:

$$H_S = 9$$

Distance from base to the last row of buildings before the mobile:

$$L = R - x$$

Number of rows of buildings:

$$N = 6$$

Assumed distance from the far side of one row of buildings to the far side of the next:

$$d = \frac{L}{N}$$

Variable in the curve-fitted Q relation: must be between 0.01 and 1 for the Q relation below to be valid:

$$g_P = \mathrm{atan}\left(\frac{H_S - h_B}{R}\right) \cdot \sqrt{\frac{d}{\lambda}} = 0.261$$

Q relation for Bertoni model for base height greater than roof height:

$$Q = 3.502 g_P - 3.327 g_P^2 + 0.962 g_P^3$$

Last roof edge diffraction angle:

$$\Phi = \mathrm{atan}\left(\frac{h_B - h_m}{x}\right)$$

Bertoni model for base height > roof height:

$$L_{\text{Bertoni\_a}} = -20 \cdot \log\left(\frac{\lambda}{4 \cdot \pi \cdot R}\right) -$$

$$20 \cdot \log\left[\frac{Q}{\sqrt{refl \cdot \pi \cdot k \cdot \sqrt{x^2 + (h_B^2 - h_m^2)}}} \cdot \left|\left(-\frac{1}{\Phi} + \frac{1}{2 \cdot \pi + \Phi}\right)\right|\right]$$

$$L_{\text{Bertoni\_a}} = 98.7$$

Base Heights Below the Roof Height

The third variation of the Bertoni model is for base heights below the local average roof height. Boersma functions must be used to substitute summations for integrations. Q becomes a function of M, which is defined as N+1, with N being the number of rows of buildings. To make things a little simpler in the example, five rows of buildings will be assumed. It does not take many rows of buildings to reduce the signal from a base antenna below roof height to insignificant levels. From a practical point of view, this method is really not as bad as it looks.

Local average roof height:

$$h_B = 6$$

Base height:

$$H_S = 4$$

Number of rows of buildings:

$$N = 5$$

Assumed distance between rows of buildings:

$$d = \frac{L}{N}$$

A validity condition of this model is that $\sqrt{\lambda \cdot d}$ be less than the difference between the base height and roof height:

$$\sqrt{\lambda \cdot d} = 1.954$$

A factor used below to calculate Q:

$$g_c = (H_S - h_B) \cdot \frac{1}{\sqrt{\lambda \cdot d}}$$

A factor in the Q relation:

$$M = N + 1$$

The summation in the Q equation below should run to infinity. However, if q gets very large, the factorial function overflows. The contribution of terms beyond q=20 is extremely small anyway. The z value was found experimentally:

$$z=25$$

$$q=2,3\ldots z$$

The first term of the series summed up in finding Q:

$$I_0 = \frac{1}{M^{\frac{3}{2}}}$$

The second term of the series summed up in finding Q:

$$I_1 = \frac{1}{4 \cdot \sqrt{\pi}} \cdot \sum_{n=1}^{M-1} \frac{1}{n^{\frac{3}{2}} \cdot (M-n)^{\frac{3}{2}}}$$

All remaining I terms are expressed in this difference equation:

$$I_q = \frac{(M-1)\cdot(q-1)}{2 \cdot M} \cdot I_{q-2} + \frac{1}{2 \cdot \sqrt{\pi} \cdot M} \cdot \sum_{n=1}^{M-2} \frac{I_{q-1}}{(M-1-n)^{\frac{1}{2}}}$$

Q factor for base heights less than roof height (the q here is just the index of summation):

$$Q = \sqrt{M} \cdot \left| \sum_{q=0}^{E} \frac{1}{q!} \cdot \left(2 \cdot g_c \cdot \sqrt{j \cdot \pi}\right)^q \cdot I_q \right|$$

Last roof edge diffraction angle:

$$\Phi = \mathrm{atan}\left(\frac{h_B - h_m}{x}\right)$$

Bertoni model for base height < roof height:

$$L_{\text{Bertoni\_b}} = -20 \cdot \log\left(\frac{\lambda}{4 \cdot \pi \cdot R}\right) - \left[ 20 \cdot \log\left|\frac{Q}{\sqrt{refl \cdot \pi \cdot k \cdot \sqrt{x^2 + (h_B^2 - h_m^2)}}} \cdot \left|-\frac{1}{\Phi} + \frac{1}{2 \cdot \pi + \Phi}\right|\right| \right]$$

$$L_{\text{Bertoni\_b}} = 118.3$$

NLOS Model for Base Heights > 5 Meters: COST231 Walfish-Ikenami

This particular model is a mixture of the deterministic and empirical models, based on free space loss with a correction for diffraction over rooftops. The COST231 Walfish-Ikegami model does not account for street guided rays, which is one reason it works best for base station antenna heights 5 meters over the local average roof height and higher. It seems best suited for sites above root heights but too short to be modeled with the traditional Okumura/Hata method or old radio broadcasting models.

The stated range of validity for COST231 Walfish-Ikegami is 0.02 to 5 km, with base station heights of 4 to 50 meters transmitting at between 800 MHz and 2 GHz. No restrictions are given for the local roof height. However, the model's accuracy drops off for base heights less than 6 meters above the roof height. For base heights greater than 6 meters over rooftop, the mean error between the measured average and the COST231 predictions in two German cities were found to be mostly below 2 dB. Like the other models presented here, the mean error must be used because COST231 Walfish-Ikegami does not try to predict fading.

The loss given by this model is the sum of three terms: free space loss, the diffraction loss over an evenly spaced array of buildings, and the diffraction loss from the last building down to the mobile.

Distance from base of mobile in km (0.02 to 5.0):

$$d=0.8$$

Frequency in MHz (800 to 2000):

$$f=880$$

As with other models, diffraction losses are added to the free space loss to complete the model. Free space loss:

$$L_{fs}=32.44+20.log(d)+20.log(f)=89.4$$

Width of streets in meters:

$$w=15$$

Height of base station in meters (4 to 50):

$$h_s=35$$

Height of rooftops in meters:

$$h_f=30$$

Height of mobiles in meters (1 to 3):

$$h_m=1.5$$

$L_{on}$ is a loss factor that tries to compensate for the differences between propagation down a street perpendicular to a radial and a street directly along a radial. The angle θ is the smallest angle between the street and a radial from the base station to the mobile on the street. $L_{on}$ itself is a piecewise function, defined as follows:

TABLE 2

| $L_{ori}$ Street Orientation Loss Factor | |
|---|---|
| θ | $L_{ori}$ |
| 0–35 | −10 + 0.354 · θ |
| 35–55 | 2.5 + 0.075 · θ (0–35) |
| 55–90 | 4.0 − 0.114 · (θ−55) |

$L_n$ is the rooftop to mobile diffraction loss: a function of θ, street width, frequency, roof height and mobile height:

$$L_m(\theta)=-16.9-10. \, log(w)+10.log(f)+20.log(h_f-h_m)+L_{ori}(\theta)$$

Rooftop to mobile diffraction loss:

$$L_{ori}(45)=33.1$$

$L_{ori}$ accounts for loss due to a series of absorbing screens—the abstraction used to model the rows of buildings. This is extremely sensitive to base heights close to the roof height. A one foot difference one way gives 5 dB less loss than one foot the other way—a good reason to use the Bertoni model for equal base and roof heights.

$L_{bsh}=0$ if antennas are lower than rooftops. Correction for base antenna height higher than rooftop height:

$$L_{bsh}=-18.log(1+h_b-h_r)$$

$K_s$ and $K_d$ are correction factors for base antenna heights below roof height. COST231 Walfish-Ikegami will be typically be used only for the case where the base is above the roofs:

$$K_2=54 K_d=18$$

$K_f$ is a frequency slope factor adjusted for the kind of area over which the signal propagates.

TABLE 3

$K_f$ Frequency Slope Factor

| Land Use Type | $K_f$ |
| --- | --- |
| Medium-sized cities and suburban areas with moderate trees | $-4 + 0.7 \cdot (f/925 - 1)$ |
| Metropolitan centers | $-4 + 1.5 \cdot (f/925 - 1)$ |

This could easily be expressed as $-4+\delta$ (f/925-1) with $\delta$ varying continuously to reflect the degree of urbanization. The degree of urbanization is estimated for the entire radio path is COST231. For the purposes of the preferred embodiment, the COST231 Walfish-Ikegami urbanization factor is fixed for medium-sized cities. Metropolitan centers refer to extremely dense urban areas for which other models are better suited.

Frequency slope parameter:

$$K_f = 4 + 0.7 \cdot \left(\frac{f}{925} - 1\right)$$

Distance between successive building faces (street width plus depth of the block of buildings between successive streets) along the radio path:

$$b=45$$

Building roofs are modeled as a series of diffracting screens. Multiscreen diffraction loss:

$$L_{msd}=L_{bsh}+K_s+K_d.log(d)+K_f log(f)-9.log(b)=11.5$$

COST231 Walfish-Ikegami loss model:

$$L_{231}=L_{fs}+L_{ru}(90)+L_{xmd}=130.8$$

COST231 Walfish-Ikegami works best if the buildings are all of uniform height, the streets of uniform width, and the blocks of uniform size. That's because those are the assumptions used in the diffraction equations underlying the model. Averages for the proposed coverage area will also work.
INCLUDE TABLE OF DEFAULT INPUTS?
Long-Range Empirical Models The long-range models are entirely empirical because they are both easy to use and fairly accurate. Some researchers have attempted to improve the accuracy of long-range models by using diffraction theory on the terrain features between the base and the mobile or by including corrections for buildings or trees in the immediate vicinity of the mobile.

The Hata-Akeyama and Sakaganu-Kuboi long-range models were disclosed in Parsons, J. D. *The Mobile Radio Propagation Channel*. New York: John Wiley & Sons, Inc., 1992 and hereby incorporated by reference.

Hata-Akeyama Model

In this model, care must be taken to enter the degree of urbanization in the "immediate vicinity of the mobile." It is typically good for rural sites with long ranges. Hata's formulation is not valid for distances under approximately 1 km. Thus, the usefulness of Hata's urban formula to modern cellular systems is limited. Akeyama and his colleagues added an S term to Hata's suburban model to account for the percentage of land in the immediate vicinity of the mobile covered by buildings. In exploring this, it was found that a building coverage parameter of 37% corresponds to Hata's urban model, 17% to Hata's suburban model, and about 2% to Hata's open model.

Frequency (MHz):

$$f32\ 880$$

Base height, between 30 and 200 meters:

$$h_t=30$$

Distance to mobile, between 1 and 20 km:

$$d=1,1.1\ldots 20 \text{ for graphing}$$

Mobile height, between 1 and 10 meters:

$$h_r=1.5$$

Mobile height correction for a large city at cellular frequencies (usually very small):

$$a=3.2.(log(11.75.h_r))^2-4.97=-9.19.10^{-4}$$

The mobile height correction for a small or medium-sized city is too small to worry about unless the mobile is over 5 feet high. It may be important for optimizing Hata using drive data taken with van-roof antennas:

$$a=(1.1.log(f)-0.7).h_r-(1.56.log(f)-0.8)=0.015$$

Hata's urban loss model:

$$L_{Hata\_u}(d)=69.55+26.16.log(f)-13.82.log(h_t)+(44.9-6.55.log(h_t)).log(d)-aL_{Hata\_u}(3)=143$$

Hata's suburban loss model:

$$L_{Hata\_s}(d) = H_{Hata\_u}(d) - 2 \cdot \log\left(\frac{f}{28}\right)^2 - 5.4$$

Hata's open area model:

$$L_{Hata\_o}(d)=L_{Hata\_u}(d)-4.78.(log(f))^2+18.33.log(f)-40.94 L_{Hata\_o}(3)=114.5$$

Akeyama's Modification

Subtracting S($\alpha$) from the Hata-Suburban model was found to give the best results. The building coverage factor x is given as:

TABLE 4

Building Coverage Factor

| Percent of Area Near Mobile Covered by Buildings: α | S (α) |
|---|---|
| 5% < α < 50% | 30 − 25 · log (α) |
| 1% < α <= 5% | 20 + 0.19 · log (α) − 15.6 · log (α)¹ |
| α < 1% | 20 |

Note that the Akeyama correction is not valid for α >= 50.

Hata-Akeyama model:

$$L_{Hata\_Akeyama}(d,\alpha) = L_{Hata\_s}(d) - S(\alpha)$$

Sakagami-Kuboi Model

This is an empirical model based on data from urban and residential areas in Japan. Sakagami-Kuboi is the only model used in the preferred embodiment with terrain adjustment. Building heights near the base, near the mobile, and in between must be entered. This is good for many of the new urban and suburban macrocell sites.

Sakagami and Kuboi used Okumura's data in addition to their own, taken in both dense urban and residential areas of Japan. They employed multiple regression analysis to come up with an empirical loss formula good for distances from 0.5 to 10 km. This model is discussed in V. E. Garg and J. E. Wilkes, *Wireless and Personal Communication Systems*, Upper Saddle River, N.J.: Prentice Hall, Inc., 1996, and which is hereby incorporated by reference. As with Hata's model, Sakagami-Kuboi is meant for relatively tall sites.

Street width in meters (5 to 50):

$$W = 15$$

Street angle in degrees (0 to 90):

$$\theta = 90$$

Building height along the street in meters (5 to 80):

$$h_S = 10$$

Average building height above the ground under the mobile in meters (5 to 50):

$$H_{av} = 15$$

Base station antenna height above the ground under the mobile, in meters (20 to 100):

$$h_T = 20$$

Base station antenna height above the ground under the base station, in meters:

$$h_{To} = 20$$

Frequency in MHz (450 to 2200): f=880

The base antenna typically must be equal to or higher than the local building height. The model is only valid for h<=$h_{To}$. Building height near the base station, in meters:

$$h = 10$$

Distance from base to mobile, in km (0.5 to 10):

$$d = 3$$

Sakagami-Kuboi loss model:

$$L_{SK} = 100 - 7.1 \cdot \log(W) + 0.023 \cdot \theta + 1.4 \cdot \log(h_s) +$$
$$6.1 \cdot \log(H_{av}) - \left[24.37 - 3.7 \cdot \left(\frac{h}{h_{To}}\right)^2\right] \cdot \log(h_T) +$$
$$(43.42 - 3.1 \cdot \log(h_T)) \cdot \log(d) + 20 \cdot \log(f) +$$
$$\exp[13 \cdot (\log(f) - 3.23)]$$
$$= 149.5$$

Atefi-Parsons Model

This method is disclosed in Atefi and Parsons, "Urban Radio Propagation in Mobile Radio Frequency Bands." *Tech. Comm., Birmingham IEE Conference Publication*, No. 262, pp. 13–18, and hereby incorporated by reference. This model should work well for the denser urban areas of large cities, but only for antennas 100 feet up or more. This model is probably valid for base heights of at least 10 to 76 meters.

Distance in km (no range of validity given):

$$d = 3$$

Frequency (MHz):

$$f = 880$$

Base height in meters:

$$h_b = 30$$

Mobile height in meters:

$$h_m = 1.5$$

Atefi-Parsons loss model:

$$L_{AP} = 82 + 26.16 \cdot \log(f) + 38 \cdot \log(d) - 21.8 \cdot \log(h_b) - 0.15 \cdot \log(h_m) = 144.9$$

The loss found for a 30-meter base station 3 km away comes within 2 dB of that predicted by Hata-urban. Atefi-Parsons does not give any correction factors for suburban environments, but may be useful for base heights from 10 to 30 meters and distances greater than 1 km in a densely built up area.

Correction for Foliage

A signal traveling over or through trees suffers a considerably higher loss than one propagating over an open field, golf course, or suburban neighborhood. None of the foregoing long-range models contain a correction term for foliage.

As discussed in M. A. Weissberger, *An Initial Critical Summary of Models for Predicting the Attenuation of Radio Waves by Trees*, Annapolis: EMC Analysis Center, ESD-TR-81-101, 1982, and hereby incorporated by reference, Weissberger compiled data from a wide range of frequencies.

TABLE 5

Weissberger's Loss Through Dry In-Leaf Trees

| Distance through Trees | Loss |
|---|---|
| 14 < $d_f$ <= 400 | $1.33 \cdot f^{0.284} \cdot d_f^{0.588}$ |
| 0 <= $d_f$ <= 14 | $0.45 \cdot f^{0.284} \cdot d_f$ |

The designer engineer may use Weissberger's formula to find the loss. For example, if a 15 meter thick stand of trees shadows the mobile from an otherwise LOS path to the base antennas, Weissberger gives the additional loss as about 6 dB.

A microcellular environment with foliage loss was discussed in Gardiol et al., "Propagation in Urban Microcells with High Rise Buildings", *Proceedings of the IEEE Vehicular Technology Conference*, 1996, pp.859–863, and hereby incorporated by reference. In a microcellular environment, loss seen by a ray going through trees, follows 1.8+12. log ($d_t$) for distances of 1 meter or more. Loss was fixed at 1.8 dB for distances less than a meter.

Penetration and Margins For Error

As previously discussed, the determination of a margin for error should be included in the propagation mode. However, a solid strategy for applying margin of errors has yet to be devised. A few rules of thumb do exist. Building penetration loss, on the average, is typically around 10 dB. Vehicle penetration loss is typically between 3 and 5 dB—perhaps more for tinted windows. For the urban microcell situation, turning a corner results typically in an additional 20 dB of loss. Add a margin for error equal to the uncertainty in the calculation. The idea is to overestimate the loss enough to compensate for the worst case variation in the input values.

In the final analysis, the best approach is to use the propagation models very carefully. Comparing the predicted RSSI with measurements computed during a drive test will help the engineer develop a feel for applying the models—and get the most value from the preferred embodiment.

FOURTH STEP

In a fourth step 208, determine all the known location information or parameters for the chosen model. Such information may include: mobile to base distance, base station height, street widths or lengths, roof height, and other data. The dimensions can come from memory, aerial photos, or detailed elevation-style maps (maps that show buildings as if seen from a tall structure on the edge of town). If the exact dimensions are not available, they may be estimated.

FIFTH STEP

In a fifth step 210, the predicted propagation loss is calculated. This is an iterative method with the design criteria constantly being changed to obtain an acceptable result. A software spreadsheet program which solves lengthy equations may be used to find the base station height at which the two losses match. A software spreadsheet program such as MICROSOFT™ SOLVER™ which is available in MICROSOFT™ EXCEL™ 7.0 may be used.

SIXTH STEP

In a sixth step 212, the predicted propagation loss is compared to the maximum allowable loss. If the predicted loss is not less than the maximum allowable loss then the design engineer will review and adjust the parameters 214 and then go back to 210. If the predicted loss is less than the maximum allowable loss and therefore an "acceptable loss", then the design engineer will go to the next step.

SEVENTH STEP

In step 216, if the parameters are not acceptable to obtain a predicted loss less than the maximum allowable loss, then new cell site design criteria may be chosen and the process repeated at that site 218. If the parameters are acceptable, then cell site design steps are completed 220.

The preferred embodiment consists of propagation models and other utilities to assist in calculating the important parameters. An aspect of the preferred embodiment is that it renders complex calculations in a more efficient manner. Another aspect of the preferred embodiment is that it is designed to determine the proper height of the cell site antenna, whether a higher gain antenna should be placed there, if the cell site is lowered will it leave a coverage hole, how far through the streets will a microcell be usable, and other design criteria.

Another aspect of the preferred embodiment is that the list of propagation models may also include more or different models than the ones described.

Another aspect of the preferred embodiment is that it reduces downlink effective radiated power (ERP) to a minimum.

Another aspect of the preferred embodiment is that it ensures that mobile phones access sites with minimum power. Another aspect of the preferred embodiment is that it allows for redesign of a system for greater capacity with microcells.

Another aspect of the preferred embodiment is that macrocells and microcells can be designed for a particular uplink loss.

The above described embodiment is illustrative of the principles of the present invention. Various modifications and changes may be devised by those skilled in the art without departing from the spirit and scope of the invention as set forth in the appended claims.

What is claimed is:

1. A method of evaluating the coverage of a geographic area serviced by a communication system using a device that accepts and manipulates cell site data and generates a parametric value comprising:

receiving an initial set of cell site design parameters wherein the initial set of cell site design parameters includes uplink parameters comprising a power level for a mobile phone;

calculating a maximum allowable loss of a signal between the mobile phone and a cell site using the initial set of cell site design parameters wherein the power level of the mobile phone is constant;

choosing at least one of a plurality of propagation models;

calculating a predicted loss of the signal by refining the initial set of cell site design parameters; and using the predicted loss to evaluate the coverage of the geographic area serviced by the communication system.

2. The method of claim 1, further comprising:

adjusting said cell site design parameters to obtain acceptable loss.

3. The method of claim 1, further comprising:

wherein at least two of the plurality of propagation models are used to determine the predicted loss.

4. The method of claim 1, wherein the propagation models are stored in a database.

5. The method of claim 1, wherein the method is performed with a computer and wherein said step of calculating a predicted loss is performed in a software program housed in the computer.

6. The method of claim 1, wherein said uplink parameters include antenna height and antenna gain.

7. A method of selecting a set of operating parameters in the design of a cell site in a wireless telecommunications system comprising:

collecting the set of operating parameters including a set of uplink parameters and a set of downlink parameters associated with the cell site, the set of uplink parameters comprising a power level for a mobile unit;

determining a maximum allowable loss to close the link between the cell site and the mobile unit in a cell based on the set of uplink parameters wherein the power level of the mobile unit is constant;

selecting at least one propagation model based on a comparison of predicted penetration loss and the set of operating parameters to determine a predicted loss;

calculating the predicted loss by refining the set of operating parameters; and using the predicted loss in designing the cell site.

8. The method of claim 7, further comprising:
a) varying the uplink design parameters to obtain an acceptable loss.

9. The method of claim 8, wherein the uplink parameters include the height of an antenna at the cell site.

10. The method of claim 8, wherein the uplink parameters include the antenna gain.

11. The method of claim 7, wherein the method is performed with a computer and wherein the maximum allowable loss is determined using a software program housed in the computer.

12. The method of claim 7, wherein the at least one includes a plurality of propagation models are used to determine the predicted loss.

13. The method of claim 7, wherein the at least one propagation model includes LOS, NLOS, and long range empirical models.

14. A method of selecting a set of operating parameters in the design of a cell site in a wireless telecommunications system comprising:

identifying a proposed location for the cell site;

collecting the set of operating parameters including a set of uplink parameters and a set of downlink parameters associated with the cell site, the set of uplink parameters comprising a power level for a mobile unit;

determining a maximum allowable loss to close the link between the cell site and a mobile unit in a cell based on the set of uplink parameters using a spreadsheet wherein the power level of the mobile unit is constant;

selecting a propagation model based on a comparison of a predicted penetration loss and the set of operating parameters to determine a predicted loss;

calculating the predicted loss by refining the set of operating parameters; and using the predicted loss in designing the cell site.

15. The method of claim 14, wherein the method is performed with a computer and wherein the spreadsheet is a software program housed in the computer.

16. A method of selecting a set of operating parameters in the design of a cell site in a wireless telecommunications system comprising:

identifying a proposed location for the cell site;

collecting the set of operating parameters including a set of uplink parameters and a set of downlink parameters associated with the cell site, the set of uplink parameters comprising a power level for a mobile unit;

determining a maximum allowable loss to close the link between the cell site and a mobile unit in a cell based on the set of uplink parameters wherein the power level of the mobile unit is constant;

selecting a propagation model based on a comparison of a predicted penetration loss and the set of operating parameters to determine a predicted loss;

calculating the predicted loss by refining the set of operating parameters;

varying the parameters to obtain an acceptable loss; and using the acceptable loss in designing the cell site;

wherein the set of uplink parameters include the height of an antenna at the cell site and wherein the set of uplink parameters include the gain of an antenna at the cell site.

17. A method of selecting a set of operating parameters in the design of a cell site in a wireless telecommunications system comprising:

identifying a proposed location for the cell site;

collecting the set of operating parameters including a set of uplink parameters and a set of downlink parameters associated with the cell site, the set of uplink parameters comprising a power level for a mobile unit;

calculating a minimum required power at the mobile unit;

calculating a minimum required power at a base station receiver;

determining a maximum allowable loss to close the link between the cell site and the mobile unit in a cell based on the set of uplink parameters wherein the power level of the mobile unit is constant;

calculating a balanced downlink effective radiated power;

selecting a propagation model based on a comparison of a predicted penetration loss and the set of operating parameters to determine a predicted loss;

calculating the predicted loss by refining the set of operating parameters; and using the predicted loss in designing the cell site.

* * * * *

UNITED STATES PATENT AND TRADEMARK OFFICE
CERTIFICATE OF CORRECTION

PATENT NO. : 6,477,376 B1
DATED : November 5, 2002
INVENTOR(S) : Kirk Carter

It is certified that error appears in the above-identified patent and that said Letters Patent is hereby corrected as shown below:

Column 11,
Line 39, "$\alpha$" shuold read -- 60 --.
Line 65, delete "$\sqrt{}$".

Column 20,
Lines 40 and 44, "$L_{on}$" should read -- $L_{ori}$ --.
Line 56, "$L_n$" should read -- $L_{rts}$ --.
Line 59, "$L_m$" should read -- $L_{rts}$ --.
Line 63, "$L_{ori}$" should read -- $L_{rts}$ --.
Line 64, "$L_{ori}$" should read -- $L_{ms}$ --.

Column 21,
Lines 7 and 48, "$K_s$" should read -- $K_a$ --.
Line 12, "$K_2{=}54Kd{=}18$" should read -- $K_a{=}54$ and $K_d{=}18$ --.
Line 52, "$L_{231}{=}L_{fs}{+}L_{ru}(90){+}L_{xma}{=}130.8$" should read -- $L_{231}{=}L_{fs}{+}L_{rts}(90){+}L_{msd}{=}130.8$ --.

Column 22,
Line 20, "$f32$" should read -- $f =$ --.
Line 55, "H" should read -- L --.
Line 57, add: -- $L_{Hata\_s}(3) = 133.1$ --.
Line 60, "$4.78.(log(f))^2{+}18.33.log(f)$" should read -- $4.78 \cdot (log(f))^2 {+} 18.33 \cdot log(f)$ --.
Line 61, line break before "$L_{Hata\_o}(3)$".

Column 23,
Line 10, "$\log (\alpha)^1$" should read -- $\log (\alpha)^2$ --.

UNITED STATES PATENT AND TRADEMARK OFFICE
CERTIFICATE OF CORRECTION

PATENT NO. : 6,477,376 B1
DATED : November 5, 2002
INVENTOR(S) : Kirk Carter

It is certified that error appears in the above-identified patent and that said Letters Patent is hereby corrected as shown below:

<u>Column 25,</u>
Line 11, "mode" should read -- model --.

Signed and Sealed this

Second Day of September, 2003

JAMES E. ROGAN
*Director of the United States Patent and Trademark Office*